(12) United States Patent
Yamaguchi et al.

(10) Patent No.: US 11,225,207 B2
(45) Date of Patent: Jan. 18, 2022

(54) VEHICLE CIRCUIT BODY

(71) Applicant: YAZAKI CORPORATION, Tokyo (JP)

(72) Inventors: Hayato Yamaguchi, Makinohara (JP); Akira Tsubaki, Makinohara (JP); Sadaharu Okuda, Makinohara (JP); Masahiro Takamatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/033,648

(22) Filed: Sep. 25, 2020

(65) Prior Publication Data
US 2021/0094487 A1    Apr. 1, 2021

(30) Foreign Application Priority Data
Sep. 27, 2019 (JP) .............................. JP2019-177673

(51) Int. Cl.
*B60R 16/02* (2006.01)
*H01B 7/08* (2006.01)
*H01B 7/04* (2006.01)

(52) U.S. Cl.
CPC ......... *B60R 16/0215* (2013.01); *H01B 7/041* (2013.01); *H01B 7/08* (2013.01)

(58) Field of Classification Search
CPC ............ B16R 60/0207; B16R 60/0215; B16R 60/0231; H01B 7/0045; H01B 7/0018; H01B 7/04; H01B 7/041; H01B 7/06; H01B 7/08; H01B 7/0823; H01B 7/0846
See application file for complete search history.

(56) References Cited

U.S. PATENT DOCUMENTS

| | | | | |
|---|---|---|---|---|
| 3,911,567 A * | 10/1975 | Hofer | ...................... | H02G 5/002 29/872 |
| 6,101,695 A * | 8/2000 | Nakamura | ........... | H01R 43/052 29/33 M |
| 6,479,762 B2 * | 11/2002 | Kusaka | .................. | H05K 1/028 174/117 F |
| 6,834,900 B2 * | 12/2004 | Wright | ................ | B60R 16/0215 137/899 |
| 6,861,591 B2 * | 3/2005 | Kusaka | .................. | H05K 1/028 174/255 |
| 2012/0125683 A1 * | 5/2012 | Mabuchi | ............. | B60R 16/0215 174/72 A |
| 2018/0174716 A1 * | 6/2018 | Kominato | ................ | B21D 7/14 |
| 2019/0061650 A1 | 2/2019 | Kato | | |

FOREIGN PATENT DOCUMENTS

JP          2019-43161 A        3/2019

* cited by examiner

*Primary Examiner* — Paresh H Paghadal
(74) *Attorney, Agent, or Firm* — Kenealy Vaidya LLP

(57) ABSTRACT

A vehicle circuit body is provided. The vehicle circuit body includes a bent portion which is formed by bending a plurality of conductor plates with a convex shape toward one side of a lamination direction in which the plurality of conductor plates are laminated, the plurality of conductor plates being laminated such that adjacent conductor plates are spaced apart from each other; and a rigid portion where the plurality of conductor plates extending from the bent portion are joined together to form a single layer. The bent portion is arranged at a position which faces an inner corner or outer corner of a concave-convex shape formed on a body panel.

5 Claims, 8 Drawing Sheets

VEHICLE CIRCUIT BODY

CROSS-REFERENCE TO RELATED APPLICATIONS

This application is based on and claims priority under 35 U.S.C. 119 from Japanese Patent Application No. 2019-177673 filed on Sep. 27, 2019, the contents of which are incorporated herein by reference.

TECHNICAL FIELD

The present invention relates to a vehicle circuit body.

BACKGROUND ART

Patent Literature 1 discloses a vehicle circuit body that can be wired along concave and convex shapes of a body panel and that can realize a reduction in size.

Patent Literature 1: JP-A-2019-043161

In a case where a vehicle wiring member, such as a battery cable, is wired in a vehicle interior, it is required to perform the wiring along concave and convex shapes of a body panel due to needs for expanding living space in the vehicle interior. In order to arrange the vehicle wiring member along the body panel, it is necessary to bend the vehicle wiring member in accordance with a shape of the body panel.

However, it is difficult to bend a thick electric wire in accordance with the shape of the body panel, and it is difficult to arrange the thick electric wire along the concave and convex shapes of the body panel. In particular, in a case where the electric wire constituting the vehicle wiring member is a flat rigid body, the vehicle wiring member can be wired in accordance with the shape of the body panel by bending predetermined locations before the wiring. However, it is necessary to prepare vehicle wiring members having different shapes in accordance with the body panel, which is not practical.

Further, when the electric wire which is formed of the flat rigid body are bent at the predetermined locations, the vehicle wiring member is not straight line-shaped, and has a three-dimensional shape which is bent at a plurality of locations, so that a size thereof tends to increase. Such a large-size vehicle wiring member is difficult to be wired to the body panel, and it is also difficult to package and transport.

In order to solve such a problem, a second power supply line and a second ground line of a second wiring material 220 in the invention disclosed in Patent Literature 1 have flexibility so as to be deformed along a shape of a raised portion (front cross member 110).

Also, in recent years, there is a demand for space saving at various locations in a vehicle interior, and wiring space where a wire harness is wired is also not an exception. Therefore, a vehicle circuit body is required to be further brought into close contact with a cross member formed on the body panel.

Meanwhile, the flexibility of the vehicle circuit body of Patent Literature 1 is realized by a braid which is formed in a strip plate shape. In the vehicle circuit body, a gap is formed between the second wiring material 220 and a body panel 1, and thus there is room for improvement. Moreover, in the case where a part of the vehicle circuit body of Patent Literature 1 is formed of the braid, it is technically difficult to flow a large current therethrough, and thus current capacity thereof tends to be reduced. Therefore, applications in which the vehicle circuit body can be used are limited.

SUMMARY OF INVENTION

According to an embodiment, a vehicle circuit body can be more closely in contact with the concave and convex shapes formed on the body panel, and has high versatility as a circuit body mounted on a vehicle.

According to the embodiment, the vehicle circuit body includes: a bent portion which includes a plurality of conductor plates, the plurality of conductor plates being laminated such that adjacent conductor plates are spaced apart from each other, each of the conductor plates having a convex shape toward one side of a lamination direction in which the plurality of conductor plates are laminated; and a rigid portion where the plurality of conductor plates extending from the bent portion are joined together to form a single layer.

The bent portion is arranged at a position which faces an inner corner or outer corner of a concave or convex shape formed on a body panel.

BRIEF DESCRIPTION OF DRAWINGS

FIG. 5A is a side view of a main part of the vehicle circuit body when FIG. 4A is viewed from a direction Va, and FIG. 5B is a side view of the main part of the vehicle circuit body when FIG. 4B is viewed from a direction Vb.

DESCRIPTION OF EMBODIMENTS

Specific embodiments of the present invention will be described below with reference to the drawings.

First, in order to deepen understanding of a vehicle circuit body of an embodiment according to the present invention, an outline of the vehicle circuit body will be described prior to description of technical features of the vehicle circuit body.

<Outline of Vehicle Circuit Body>
(Vehicle Circuit Body)

First, a basic configuration of the vehicle circuit body will be described.

Figure 1:
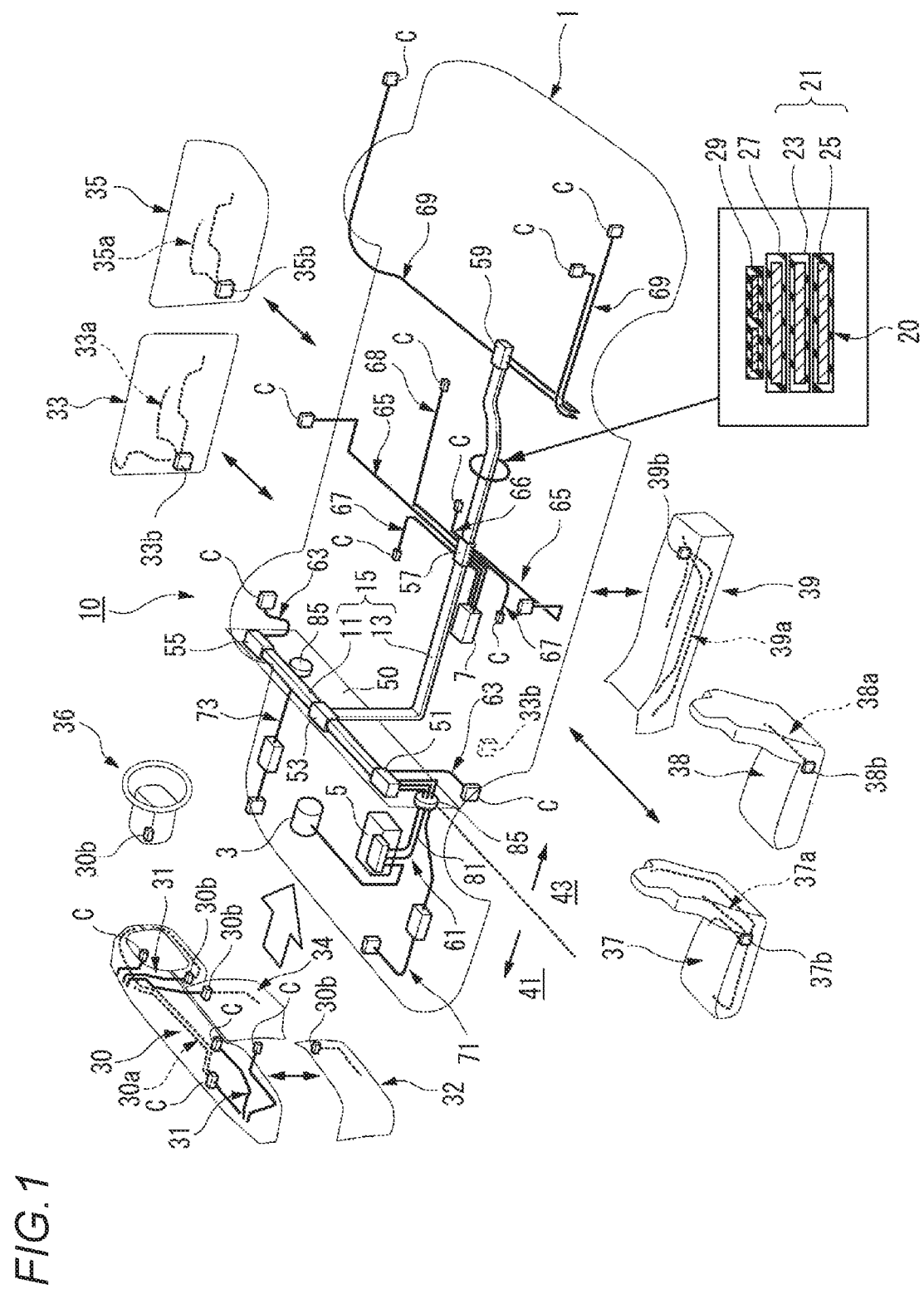
FIG. 1 shows an outline of a layout and a connection state of each portion before connection to a vehicle circuit body in a state where the vehicle circuit body is wired on a body panel.

An outline of a layout and a connection state of each portion in a state where a vehicle circuit body 10 is wired on a body panel is shown in FIG. 1.

The vehicle circuit body is used to supply electric power of a main power supply such as an in-vehicle battery to auxiliary devices (electronic components) of each portion of a body panel, or used as a transmission path necessary for exchanging signals between the electronic components. That is, although the vehicle circuit body is functionally similar to a general wire harness mounted in a vehicle, a shape and a structure thereof are greatly different from those of the general wire harness.

Specifically, in order to simplify the structure, a trunk line which includes a power supply line having predetermined current capacity, a communication line having predetermined communication capacity, and a ground line is formed of a wiring material 20 which has a simple shape such as a backbone. The "predetermined current capacity" is, for example, current capacity which is necessarily sufficient when all electronic components that can be mounted on an attachment target vehicle are mounted and used. The "predetermined communication capacity" is, for example, communication capacity which is necessarily sufficient when all the electronic components that can be mounted on the attachment target vehicle are mounted and used. Various auxiliary devices (electronic components) can be connected via branch lines connected to a plurality of control boxes distributed along the trunk line.

Figure 2:
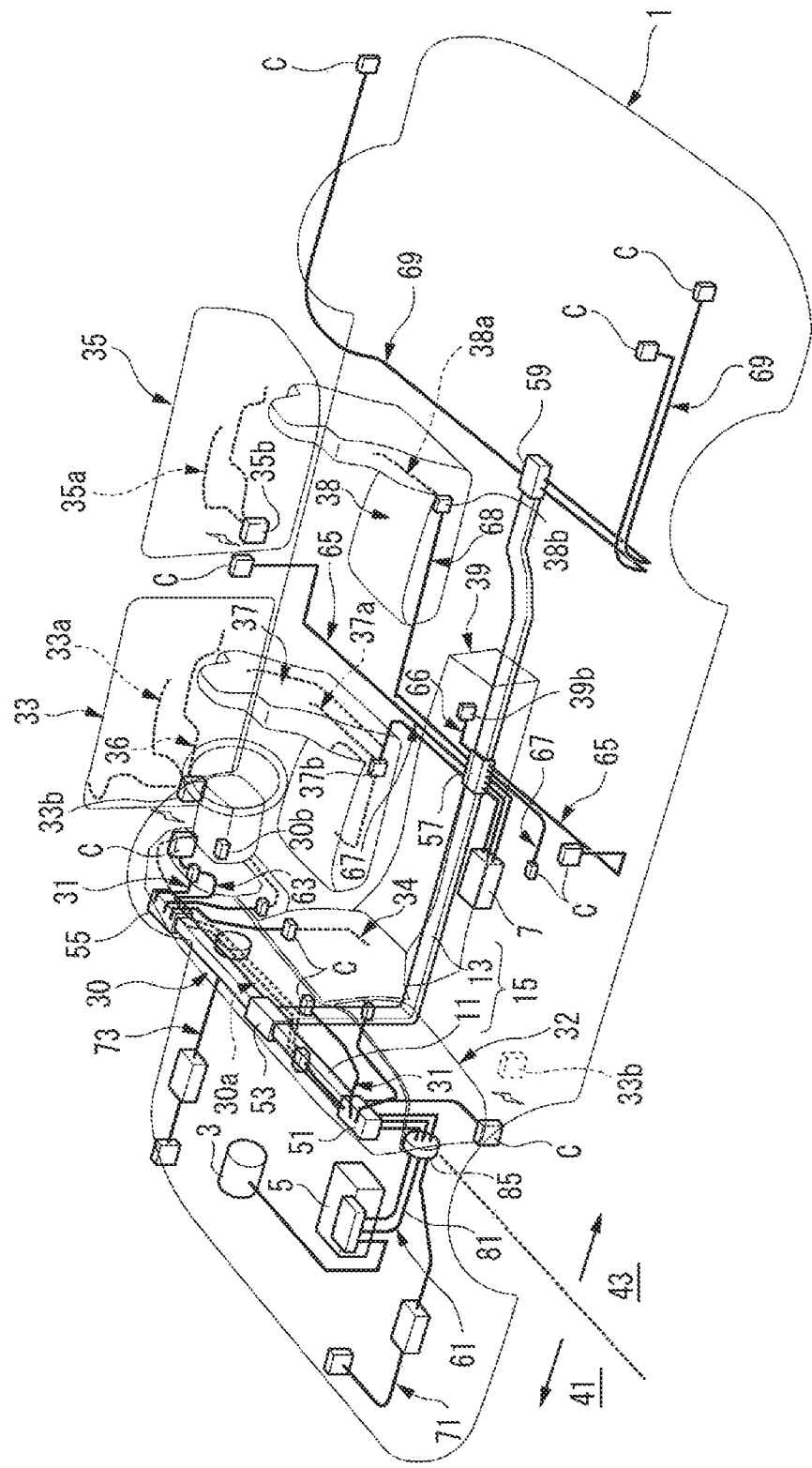
FIG. 2 shows an outline of a layout and a connection state of each portion after the connection to the vehicle circuit body in a state where the vehicle circuit body is wired on the body panel.

The vehicle circuit body 10 shown in FIGS. 1 and 2 includes, a trunk line, branch lines, and a plurality of control boxes as basic constituent elements. The trunk line (a backbone trunk line portion 15) includes: a power supply line 21; a ground line 27; and a communication line 29, and is wired on a body panel 1. The branch lines (an instrument panel branch line sub-harness 31, a front door branch line sub-harness 63, a rear door branch line sub-harness 65, a center console branch line sub-harness 66, a front seat branch line sub-harness 67, a rear seat branch line sub-harness 68 and a luggage branch line sub-harness 69) are connected to electronic components of each portion of the body panel. The plurality of control boxes (a supply side control box 51, a branch control box 53, an intermediate control box 57, and control boxes 55, 59) include a control unit configured to distribute electric power of the power supply line 21 and signals of the communication line 29, which are supplied to the trunk line, to the branch lines connected to the trunk line. The plurality of control boxes are distributed along the trunk line.

Further, the backbone trunk line portion 15 of the vehicle circuit body 10 is roughly divided into an instrument panel backbone trunk line portion 11 and a floor backbone trunk line portion 13.

The instrument panel backbone trunk line portion 11 is arranged linearly in a left-right direction at a location along a surface of a dash panel 50 so as to be substantially parallel to a lean hose (not shown) at a position above the lean hose. It should be noted that the instrument panel backbone trunk line portion 11 may also be fixed to the lean hose.

The floor backbone trunk line portion 13 is arranged to extend in a front-rear direction of the body panel 1 at a substantially central portion in the left-right direction of the body panel 1 along a vehicle interior floor, and extends linearly in an up-down direction at a location along the surface of the dash panel 50 such that a tip end thereof is connected to an intermediate portion of the instrument panel backbone trunk line portion 11. A connection portion between the instrument panel backbone trunk line portion 11 and the floor backbone trunk line portion 13 is in a state where the instrument panel backbone trunk line portion 11 and the floor backbone trunk line portion 13 can be electrically connected to each other via a branch portion of the branch control box 53 to be described below. That is, the backbone trunk line portion 15 is constituted by the instrument panel backbone trunk line portion 11 and the floor backbone trunk line portion 13 in a shape that is similar to a T-shape.

Further, an engine compartment sub-harness 61 is connected to the instrument panel backbone trunk line portion 11 via the supply side control box 51 which is arranged on a left side of the body panel 1 upstream of the backbone trunk line portion 15. The engine compartment sub-harness 61 includes a main power supply cable 81 configured to electrically connect a main battery 5, which is a main power supply arranged in an engine room (engine compartment) 41, and an alternator 3 to each other.

Here, the dash panel 50 is provided on a boundary between the engine room 41 and a vehicle compartment 43, and it is required to completely seal locations where an electric connection member penetrates the dash panel 50. That is, in order to maintain comfort in the vehicle compartment 43, the dash panel 50 needs to have functions such as insulating vibrations from the engine room 41, reducing vibrations and noises from a suspension, blocking high heat, noises, odors and the like, and thus sufficient consideration is required to be given to the locations where the electric connection member penetrates so as not to impair such functions.

As described above, the main constituent elements of the vehicle circuit body 10 (the instrument panel backbone trunk line portion 11 and the floor backbone trunk line portion 13), the supply side control box 51, the branch control box 53, the intermediate control box 57, and the control boxes 55, 59 are all arranged in space on the side of the vehicle compartment 43. The main power supply cable 81, which is connected to the supply side control box 51 provided at a left end of the instrument panel backbone trunk line portion 11, is wired so as to pass through a grommet 85 which is inserted into a through hole of the dash panel 50, and is connected to the engine compartment sub-harness 61 in the engine room 41. As a result, the electric power of the main power supply can be supplied to the supply side control box 51. Moreover, the main power supply cable 81 may be made of a material that is easily bendable, may have a circular cross-sectional shape, or may have a cross-sectional area smaller than that of the instrument panel backbone trunk line portion 11, so that sealing can be easily performed by the grommet 85, and deterioration of workability can be avoided at the time of performing the wiring.

Various electronic components in the engine room 41 may be connected to the instrument panel backbone trunk line portion 11 in the vehicle compartment 43. In this case, a desired electric connection path can be realized by, for example, installing a sub-harness 71 which is connected to the supply side control box 51 in a manner of penetrating the dash panel 50 or installing a sub-harness 73 which is connected to the control box 55 in the manner of penetrating the dash panel 50. In this case, since the sub-harnesses 71, 73 and the like have a small cross-sectional area and are easily bent, it is easy to seal locations where the dash panel 50 is penetrated.

The instrument panel branch line sub-harness (branch line) 31 and the front door branch line sub-harness (branch line) 63 are connected to the instrument panel backbone trunk line portion 11 via the supply side control box 51 and the control box 55.

The instrument panel branch line sub-harness 31 is electrically connected, via a module connector C, to a module driver 30b of an instrument panel harness 30a which is electrically connected to a control unit of an electronic component such as a meter panel or an air conditioner mounted on an instrument panel module 30.

It is preferable that a front door branch line sub-harness 63 is connected to a module driver 33b of the front door branch line sub-harness 33a, which is electrically connected to a control unit of an electronic component such as a door lock or a power window mounted on a front door 33, such that contactless power supply and close proximity wireless communication are possible.

Further, the rear door branch line sub-harness (branch line) 65, the center console branch line sub-harness (branch line) 66, the front seat branch line sub-harness (branch line) 67, the rear seat branch line sub-harness (branch line) 68, and a sub battery 7 are connected to the floor backbone trunk line portion 13 via the intermediate control box 57.

It is preferable that the rear door branch line sub-harness 65 is connected to a module driver 35b of a rear door harness 35a, which is electrically connected to a control unit of an electronic component such as a door lock or a power window mounted on a rear door 35, such that contactless power supply and close proximity wireless communication are possible.

The center console branch line sub harness 66 is electrically connected, via the module connector C, to a module driver 39b of a center console harness 39a which is electrically connected to a control unit of an electronic component such as an air conditioner or an audio operation panel mounted on a center console 39.

The front seat branch line sub-harness 67 is electrically connected, via the module connector C, to a module driver 37b of a front seat harness 37a which is electrically connected to a control unit of an electronic component such as an electric reclining or a seat heater mounted on a front seat 37.

The rear seat branch line sub-harness 68 is electrically connected, via the module connector C, to a module driver 38b of a rear seat harness 38a which is electrically connected to a control unit of an electronic component such as an electric reclining or a seat heater mounted on a rear seat 38.

Further, the luggage branch line sub-harness (branch line) 69 is connected to the floor backbone trunk line portion 13 via the control box 59 which is arranged on a rear side of the body panel 1 downstream of the trunk line.

The luggage branch line sub-harness 69 is electrically connected, via the module connector C, to a module driver of a luggage harness (not shown) which is electrically connected to control units of various electronic components in a luggage room.

The module connector C can collectively connect power supply, ground power and signals to the control boxes such that electric power and signals can be efficiently transmitted to the backbone trunk line portion 15 and each auxiliary device.

(Wiring Material)

The backbone trunk line portion 15 of the vehicle circuit body 10 includes the power supply line 21, the communication line 29 and the ground line 27, each of which is formed of the wiring material 20 which includes a strip conductor.

In the configuration shown in FIG. 1, since it is assumed that the sub battery (sub power supply) 7 is provided, a main power supply system (power supply line) 23 and a sub power supply system (power supply line) 25 are included as the power supply line 21 in the backbone trunk line portion 15 of the vehicle circuit body 10.

The power supply line 21, the ground line 27 and the communication line 29 of the wiring material 20 in the backbone trunk line portion 15 are formed by adopting flat conductors made of a strip-shaped metal material (for example, a copper alloy or aluminum) whose cross-sectional shape is flat and laminating such flat conductors, whose periphery is covered with an insulating sheath, in a thickness direction (see FIG. 1). That is, the main power supply system 23 is laminated on the sub power supply system 25 that constitutes the power supply line 21, and the communication line 29 in which a pair of flat conductors are arranged side by side, for example, is laminated on the ground line 27 which is laminated on the main power supply system 23.

As a result, the wiring material 20 allows a large current to pass therethrough, and is relatively easy to bend in the thickness direction. In the wiring material 20, the power supply line 21 and the ground line 27 can be arranged side by side in parallel with each other, and the ground line 27 is laminated between the communication line 29 and the power supply line 21, so that sneak of power supply noises can be prevented.

Although the power supply line 21 of the backbone trunk line portion 15 requires a large cross-sectional area to secure the predetermined current capacity, the power supply line 21 is formed of the wiring material 20 which includes the strip-shaped flat conductor whose cross-sectional shape is flat, so that the power supply line 21 is easily bent in the thickness direction, and it is easy to wire the power supply line 21 along a predetermined wiring route.

The technical features of the present invention reside in the wiring material 20, and a detailed structure of the wiring material 20 will be described later below (Control Box)

The vehicle circuit body 10 includes five control boxes including: the supply side control box 51 which is arranged at an upstream end of the backbone trunk line portion 15 (the left end of the instrument panel backbone trunk line portion 11); the branch control box 53 which is arranged at a branch portion in the middle of the backbone trunk line portion 15 (the connection portion between the instrument panel backbone trunk line portion 11 and the floor backbone trunk line portion 13); the intermediate control box 57 which is arranged in the middle of the backbone trunk line portion 15 (an intermediate portion of the floor backbone trunk line portion 13); and the control boxes 55, 59 which are arranged at a downstream end of the backbone trunk line portion 15 (a right end of the instrument panel backbone trunk line portion 11 and a rear end of the floor backbone trunk line portion 13).

(Module)

In the vehicle circuit body 10, the instrument panel branch line sub-harness 31, the front door branch line sub-harness 63, the rear door branch line sub-harness 65, the center console branch line sub-harness 66, the front seat branch line sub-harness 67, the rear seat branch line sub-harness 68 and the like, which are connected to the backbone trunk line portion 15 as the branch lines, are configured as modules integrated with the instrument panel module 30, the front door 33, the rear door 35, the center console 39, the front seat 37, the rear seat 38 and the like.

That is, the instrument panel branch line sub-harness 31 is connected to the module driver 30b of the instrument panel harness 30a Which is electrically connected to the control unit of the electronic component mounted on the instrument panel module 30, and thus can be configured as a module integrated with the instrument panel module 30.

The front door branch line sub-harness 63 is connected to the module driver 33b of the front door branch line sub-harness 33a which is electrically connected to the control unit of the electronic component mounted on the front door 33 such that contactless power supply and close proximity wireless communication are possible, and thus can be configured as a module integrated with the front door 33.

The rear door branch line sub-harness 65 is connected to the module driver 35b of the rear door harness 35a which is electrically connected to the control unit of the electronic component mounted on the rear door 35 such that contactless power supply and close proximity wireless communication are possible, and thus can be configured as a module integrated with the rear door 35.

The center console branch line sub-harness 66 is connected to the module driver 39b of the center console harness 39a which is electrically connected to the control unit of the electronic component mounted on the center console 39, and thus can be configured as a module integrated with the center console 39.

The front seat branch line sub-harness 67 is connected to the module driver 37b of the front seat harness 37a which is electrically connected to the control unit of the electronic component mounted on the front seat 37, and thus can be configured as a module integrated with the front seat 37.

The rear seat branch line sub-harness 68 is connected to the module driver 38b of the rear seat harness 38a which is electrically connected to the control unit of the electronic component mounted on the rear seat 38, and thus can be configured as a module integrated with the rear seat 38.

Further, as shown in FIG. 1, the instrument panel module 30 is constituted by a plurality of instrument panel sub modules such as a glove box 32, a center cluster 34, and a steering 36 together with an instrument panel body.

The supply side control box 51 which is arranged on the left side of the instrument panel backbone trunk line portion 11 is located on the left side of the body panel 1 of the instrument panel module 30 where the glove box 32 is attached.

Therefore, in a case where a mechanical relay or a mechanical fuse for power supply distribution is provided inside the supply side control box 51 which is electrically connected to the main battery 5 via the main power supply cable 81, the mechanical relay and the mechanical fuse in the supply side control box 51 can be easily accessed by removing the glove box 32, which facilitates maintenance for replacing the mechanical relay and the mechanical fuse.

(Effect of Vehicle Circuit Body)

As described above, according to the vehicle circuit body 10, a vehicle circuit body which has a simple structure can be configured by the backbone trunk line portion 15, which has the predetermined current capacity and the predetermined communication capacity and is wired on the body panel 1, and the branch lines (the instrument panel branch line sub-harness 31, the front door branch line sub-harness 63, the rear door branch line sub-harness 65, the center console branch line sub-harness 66, the front seat branch line sub-harness 67, the rear seat branch line sub-harness 68, the luggage branch line sub-harness 69 and the like), which connect the electronic components of each portion of the body panel to the backbone trunk line portion 15 via the five control boxes (the supply side control box 51, the branch control box 53, the intermediate control box 57, and the control boxes 55, 59) distributed along the backbone trunk line portion 15.

That is, the backbone trunk line portion 15, which has a simple overall shape constituted by the instrument panel backbone trunk line portion 11 extending in the left-right direction of the body panel 1 and the floor backbone trunk line portion 13 extending in the front-rear direction of the body panel 1 at the substantially central portion of the body panel 1, is easy to manufacture. The backbone trunk line portion 15 may also have a divided structure that can be divided between the control boxes, and can also be structured to be connected via the control boxes.

The outline of the vehicle circuit body has been described above. A wiring body of the present invention, which can be wired along concave and convex shapes of a body panel, is applied to such a vehicle circuit body. Hereinafter, the vehicle circuit body of the embodiment according to the present invention will be described in detail.

<Vehicle Circuit Body of First Embodiment According to Present Invention>

Figure 3:
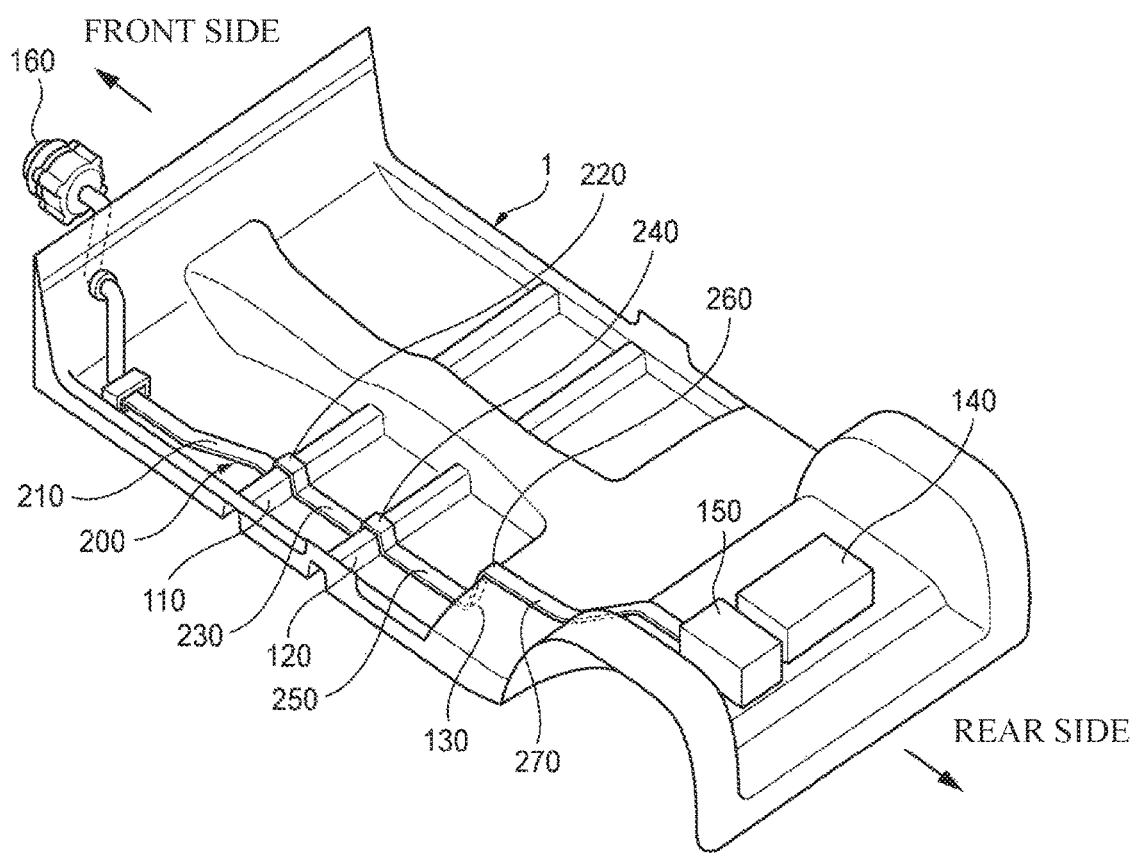
FIG. 3 is a perspective view showing an example of wiring a vehicle circuit body of a first embodiment according to the present invention to a body panel.

FIG. 3 is a perspective view showing an example of wiring a vehicle circuit body of a first embodiment according to the present invention to a body panel. When used as a battery cable, a vehicle circuit body 200 is wired along the body panel 1 across a front cross member 110 on a front (Fr) side of a vehicle, a rear cross member 120 on a rear (Rr) side, and a rear floor 130 on the rear (Rr) side of the rear cross member 120. As a result, the vehicle circuit body 200 can connect an alternator 160 and the like on the front side to a fuse box 150 which is connected to a battery 140 on the rear side.

In the first embodiment, the battery cable that connects the fuse box 150 and the alternator 160 is constituted by the single vehicle circuit body 200, and it is needless to say that the battery cable can also be constituted by a vehicle circuit body which is divided into a plurality of parts in a longitudinal direction. The divided vehicle circuit body is electrically connected via a branch box, a connection connector, or the like.

Figure 4B:
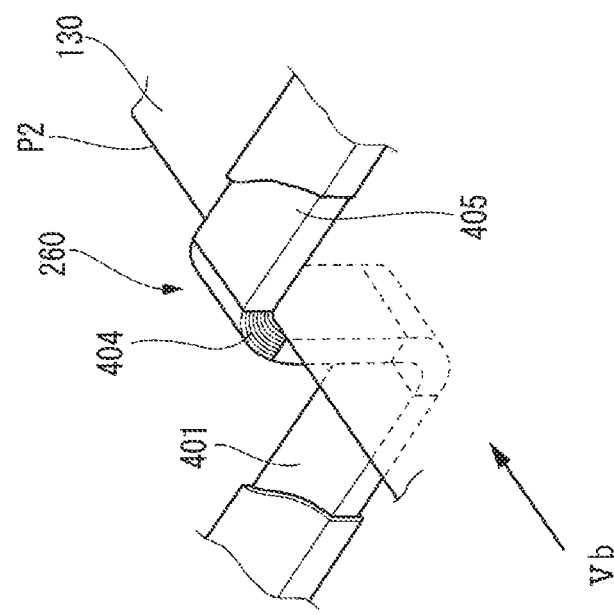
FIGS. 4A and 4B show a state where the vehicle circuit body of the first embodiment according to the present invention is wired to the body panel, and are main part perspective views in which an insulating sheath is removed and an interior of the vehicle circuit body is partially exposed.
Figure 4A:
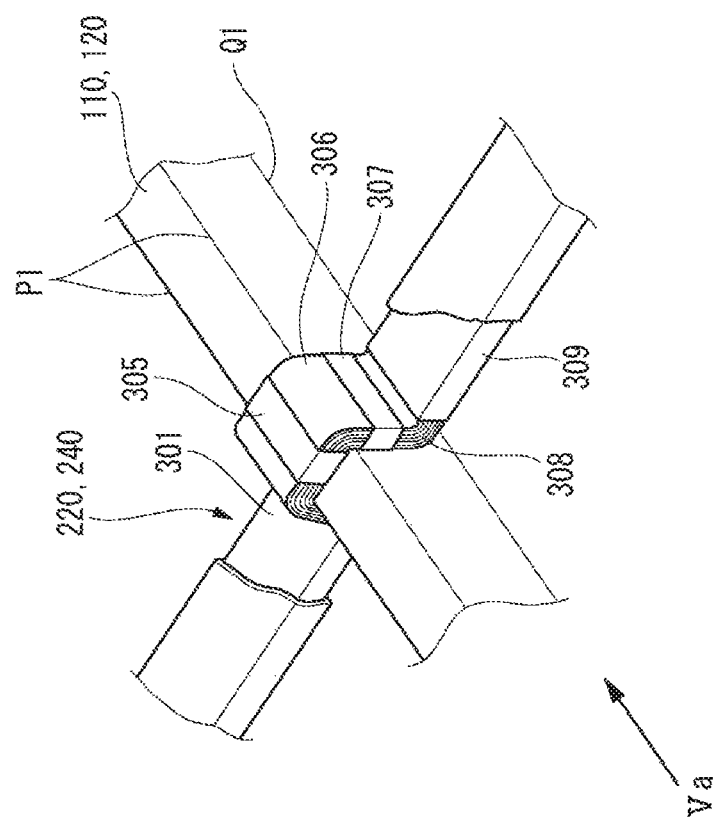
Figure 5B:
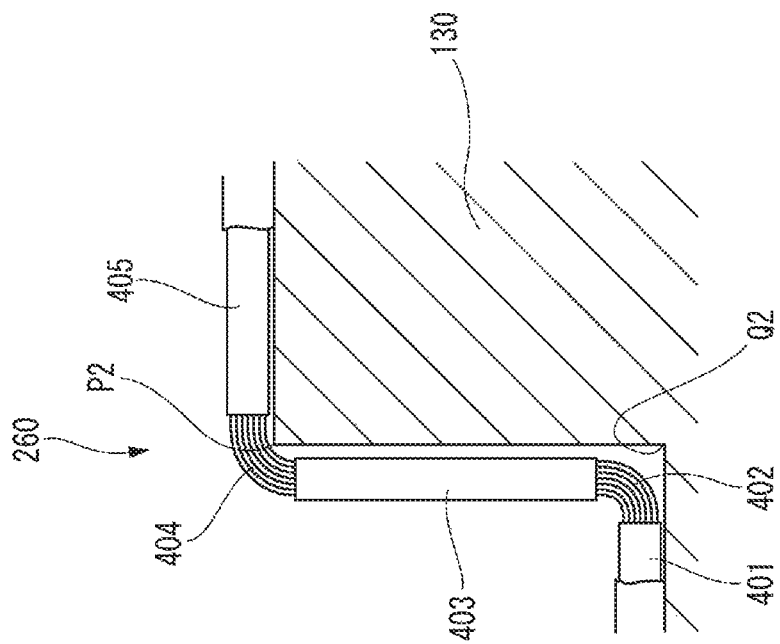
FIGS. 5A and 5B are side views of the vehicle circuit body of FIGS. 4A and 4B.
Figure 5A:
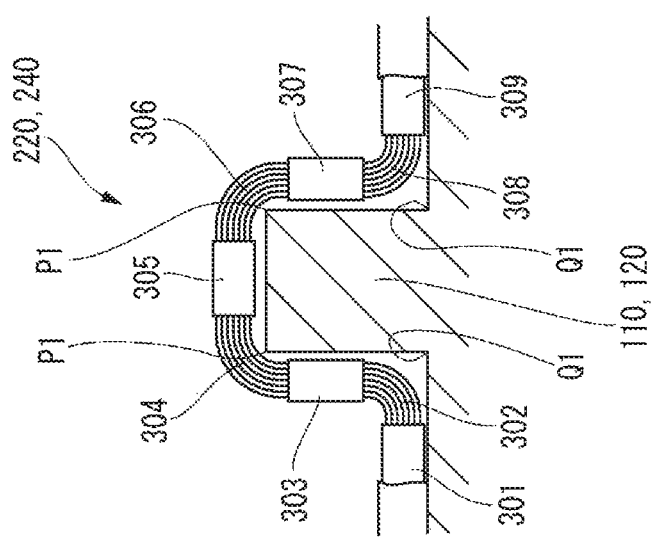

As shown in FIG. 3, the vehicle circuit body 200 is wired across the front cross member 110, the rear cross member 120, and the rear floor 130 which protrude from a horizontal surface of the body panel 1 toward the side of a vehicle compartment. Specifically, the vehicle circuit body 200 has a shape in which the vehicle circuit body 200 is bent at three locations of the front cross member 110, the rear cross member 120 and the rear floor 130 along protruding shapes of each of the locations. Hereinafter, a structure of the vehicle circuit body 200 will be described in detail. FIGS. 4A and 4B show a state where the vehicle circuit body of the first embodiment according to the present invention is wired to the body panel. FIGS. 4A and 4B are main part perspective views in which an insulating sheath is removed and an interior of the vehicle circuit body is partially exposed. FIGS. 5A and 5B are side views of the vehicle circuit body of FIGS. 4A and 4B. FIG. 5A is a side view of a main part of the vehicle circuit body when FIG. 4A is viewed from the direction Va, and FIG. 5B is a side view of the main part of the vehicle circuit body when FIG. 4B is viewed from the direction Vb. Conductors (a bent portion and a rigid portion to be described later below) exposed from the insulating sheath are exposed in FIGS. 4A to 5B to facilitate understanding of the present invention. However, it should be noted that the conductors are covered with the insulating sheath when the present invention is implemented.

In the vehicle circuit body 200, as shown in FIG. 3, a first wiring material 210, a second wiring material 220, a third wiring material 230, a fourth wiring material 240, a fifth wiring material 250, a sixth wiring material 260 and a seventh wiring material 270 are connected in such an order. Specifically, one end of the first wiring material 210 is connected to the alternator 160. The other end of the first wiring material 210 is connected to one end of the second wiring material 220. The other end of the second wiring material 220 is connected to one end of the third wiring material 230. The other end of the third wiring material 230 is connected to one end of the fourth wiring material 240. The other end of the fourth wiring material 240 is connected to one end of the fifth wiring material 250. The other end of the fifth wiring material 250 is connected to one end of the sixth wiring material 260. The other end of the sixth wiring material 260 is connected to one end of the seventh wiring material 270. The other end of the seventh wiring material 270 is connected to the fuse box 150.

The first wiring material 210, the third wiring material 230, the fifth wiring material 250 and the seventh wiring material 270 are located on flat portions of the body panel 1 (that is, recessed portions or the rear floor 130 of the body panel 1). Meanwhile, the second wiring material 220, the fourth wiring material 240 and the sixth wiring material 260 are located along protruding portions of the body panel 1 (that is, the front cross member 110, the rear cross member 120 or portions from the recessed portions of the body panel 1 to the rear floor 130).

Power supply lines, ground lines and communication lines of the first wiring material 210, the third wiring material 230, the fifth wiring material 250 and the seventh wiring material 270 are each formed of a flat conductor which is formed in a strip plate shape. Such a flat conductor is formed by extruding a copper material or an aluminum material. Therefore, the first wiring material 210, the third wiring material 230, the fifth wiring material 250 and the seventh wiring material 270 have a strip plate shape as a whole and have low flexibility. When the first wiring material 210, the third wiring material 230, the fifth wiring material 250 and the seventh wiring material 270 are wired, such wiring materials are wired at the flat locations of the body panel 1.

Meanwhile, power supply lines, ground lines and communication lines of the second wiring material 220, the fourth wiring material 240 and the sixth wiring material 260 are each formed of a conductor having high flexibility. As a result, as shown in FIGS. 4A and 5A, the second wiring material 220 and the fourth wiring material 240 are wired on the body panel 1 so as to be deformed along an outer surface of the front cross member 110 or the rear cross member 120 whose cross section protrudes in a rectangular shape. As shown in FIGS. 4B and 5B, the sixth wiring material 260 is wired on the body panel 1 so as to be deformed along a wall surface from the recessed portion of the body panel 1 to the rear floor 130. In FIGS. 4A to 5B, in order to facilitate understanding of the present invention, a case where only the power supply lines are included in the second wiring material 220, the fourth wiring material 240 and the sixth wiring material 260 as the conductors is shown. In a case where the second wiring material 220, the fourth wiring material 240 and the sixth wiring material 260 are constituted by the power supply lines, the ground lines and the communication lines, each line is configured as shown in FIGS. 4A and 5A, and each line is laminated in the thickness direction as shown in FIG. 1.

The second wiring material 220 and the fourth wiring material 240 will be described in more detail. As shown in FIG. 5A, a part of the conductors (a rigid portion 301) of the second wiring material 220 and the fourth wiring material 240 extends in a horizontal direction from the front side to the rear side. Another part (a bent portion 302) connected to the rigid portion 301 is bent in a bow shape so as to rise in a vertical direction from the horizontal direction. Another part (a rigid portion 303) connected to the bent portion 302 extends in the vertical direction. Another part (a bent portion 304) connected to the rigid portion 303 is bent in a bow shape from the vertical direction to the horizontal direction. Another part (a rigid portion 305) connected to the bent portion 304 extends in the horizontal direction. Another part (a bent portion 306) connected to the rigid portion 305 is bent in a bow shape so as to fall in the vertical direction from the horizontal direction. Another part (a rigid portion 307) connected to the bent portion 306 extends in the vertical direction. Another part (a bent portion 308) connected to the rigid portion 307 is bent in a bow shape from the vertical direction to the horizontal direction. Another part (a rigid portion 309) connected to the bent portion 308 extends in the horizontal direction.

As shown in FIG. 5A, the rigid portions 301, 303, 305, 307, 309 and the bent portions 302, 304, 306, 308 of the second wiring material 220 and the fourth wiring material 240 are located alternately. Further, the bent portions 304, 306 are provided at positions facing an outer corner P1 of the front cross member 110 or the rear cross member 120, and the bent portions 302, 308 are provided at positions facing an inner corner Q1 of the front cross member 110 or the rear cross member 120. Since the conductors of the second wiring material 220 and the fourth wiring material 240 of the vehicle circuit body 200 have such a structure, the second wiring material 220 and the fourth wiring material 240 can be more closely in contact with the front cross member 110 or the rear cross member 120.

Further, the sixth wiring material 260 will be described in more detail. As shown in FIG. 5B, a part of the conductors (a rigid portion 401) of the sixth wiring material 260 extends in the horizontal direction from the front side to the rear side. Another part (a bent portion 402) connected to the rigid portion 401 is bent in a bow shape so as to rise in the vertical direction from the horizontal direction. Another part (a rigid portion 403) connected to the bent portion 402 extends in the vertical direction. Another part (a bent portion 404) connected to the rigid portion 403 is bent in a bow shape from the vertical direction to the horizontal direction. Another part (a rigid portion 405) connected to the bent portion 404 extends in the horizontal direction.

As shown in FIG. 5B, the rigid portions 401, 403, 405 and the bent portions 402, 404 of the sixth wiring material 260 are located alternately. Further, the bent portion 404 is provided at a position facing an outer corner P2 of the rear floor 130, and the bent portion 402 is provided at a position facing an inner corner Q2 of the rear floor 130. Since the conductors of the sixth wiring material 260 of the vehicle circuit body 200 have such a structure, the sixth wiring material 260 can be more closely in contact with the rear floor 130.

Figure 6:
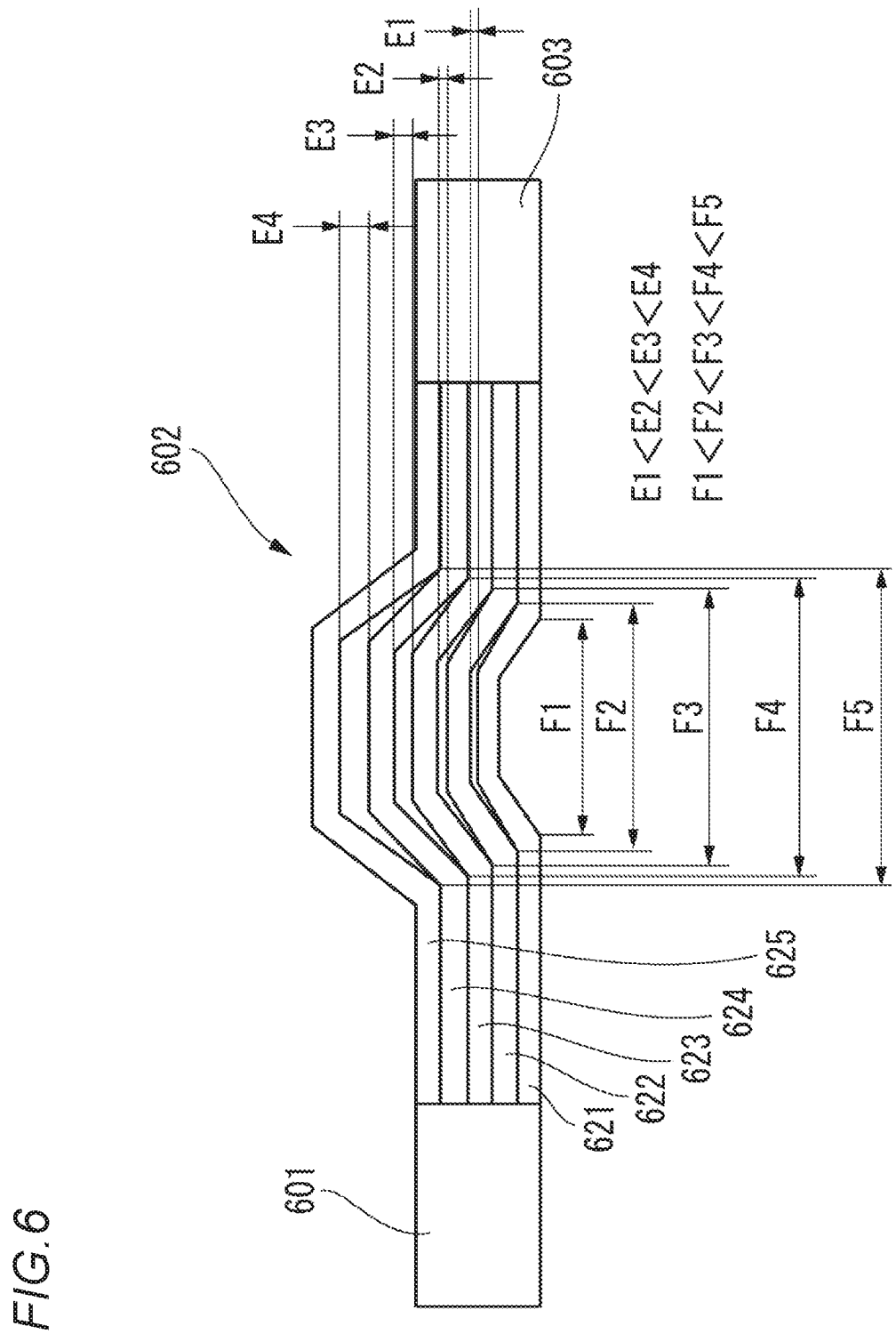
FIG. 6 is a side view of a bent portion and a rigid portion of the vehicle circuit body of the first embodiment according to the present invention.

Subsequently, structures of the above bent portions and rigid portions will be described. Here, the structures will be described through using two rigid portions 601, 603 and one bent portion 602 located at a position sandwiched between the rigid portions 601, 603. FIG. 6 is a side view of the bent portions and the rigid portions of the vehicle circuit body of the first embodiment according to the present invention. The vehicle circuit body 200 shown in FIG. 6 is shown in a state where the vehicle circuit body 200 is deployed on a horizontal surface before being wired on the body panel 1.

First, the structure of the bent portion 602 will be described in detail. The bent portion 602 is formed by laminating a plurality of conductor plates 621, 622, 623, 624, 625 in such an order. Each of the conductor plates 621 to 625 has substantially the same thickness. Each of the conductor plates 621 to 625 has a convex shape protruding in the middle of a longitudinal direction (front-rear direction of FIG. 3, left-right direction in FIG. 6) toward one side (upward in FIG. 6) of a lamination direction (up-down direction in FIG. 6) in which the conductor plates 621 to 625 are laminated. Protrusion heights of the convex shapes of each of the conductor plates 621 to 625 are different. As shown in FIG. 6, the protrusion heights increase in an order of the conductor plate 621, the conductor plate 622, the conductor plate 623, the conductor plate 624 and the conductor plate 625. With such a structure, gaps are formed between convex-shaped portions of the conductor plates 621 to 625 which are adjacent to each other in the lamination direction.

Further, distances of four gaps formed between the conductor plates 621 to 625 by which the conductor plates are spaced apart from each other along the lamination direction increase in an order of E1, E2, E3, E4. In other words, a distance between adjacent conductor plates increases toward the one side of the lamination direction. The distance E1 is a distance of a gap between the conductor plates 621, 622. The distance E2 is a distance of a gap between the conductor plates 622, 623. The distance E3 is a distance of a gap between the conductor plates 623, 624. The distance E4 is a distance of a gap between the conductor plates 624, 625.

Further, in recesses formed on back surfaces of the convex shapes of each of the conductor plates 621 to 625, sizes of the recesses in the longitudinal direction of the conductor plate increase in an order of F1, F2, F3, F4, and F5. In other words, an interval width between two facing slopes forming the convex shape of each of the conductor plates 621 to 625 increases. The width F1 is an interval between two facing slopes forming the convex shape of the conductor plate 621. The width F2 is an interval between two facing slopes forming the convex shape of the conductor plate 622. The width F3 is an interval between two facing slopes forming the convex shape of the conductor plate 623. The width F4 is an interval between two facing slopes forming the convex shape of the conductor plate 624. The width F5 is an interval between two facing slopes forming the convex shape of the conductor plate 625.

Subsequently, structures of the rigid portions 601, 603 will be described in detail. The rigid portion 601 is formed by joining the conductor plates 621 to 625 located on one end side (front side) of the above bent portion 602 to form a single layer. Meanwhile, the rigid portion 603 is formed by joining the conductor plates 621 to 625 located on another one end side (rear side) of the above bent portion 602 to form a single layer. The rigid portions 601, 603 are formed, for example, by pressing the plurality of conductor plates extending from the bent portion 602.

The wiring material in which the rigid portions 601, 603 and the bent portion 602 are formed in this way can be bent in a direction opposite to a direction in which portions on two sides of the convex-shaped portion of the bent portion 602 protrude in the convex shape. Meanwhile, bending in the same direction as the direction in which the portions on the two sides protrudes in the convex shape is restricted due to rigidity of the conductor plates 621 to 625, This is because the gaps are formed between the convex-shaped portions of the conductor plates 621 to 625 which are adjacent to each other in the lamination direction so as to allow displacement attempting to fill the gaps for the conductor plates which have larger protrusion heights. Moreover, the conductor plates 621 to 625 satisfy the above magnitude relationship of the distances E1, E2, E3, E4 and the widths F1, F2, F3, F4, F5, so that any one of the conductor plates 622 to 625 can be displaced to completely fill the gap between the one conductor plate and the conductor plate on an opposite side whose protrusion height is smaller.

The bent portion 602 which is bent to fill the gaps between the conductor plates 621 to 625 in this way may be regarded as one single metal plate having a thickness that is approximately equal to a total thickness of the conductor plates 621 to 625, and can have high current capacity. Moreover, further displacement is restricted by the rigidity of the conductor plates 621 to 625 after the bent portion 602 is bent to fill all the gaps between the conductor plates 621 to 625. This means that a bent shape of the bent portion 602 (specifically, an opening angle of the rigid portions 601, 603 centered on the bent portion 602) can be designed as desired by adjusting numerical values of the distances E1, E2, E3, E4 and the widths F1, F2, F3, F4, F5.

The rigid portions 601, 603 and the bent portion 602 whose structures are described above are applied to the rigid portions 301, 303, 305, 307, 309, 401, 403, 405 and the bent portions 302, 304, 306, 308, 402, 404 described with reference to FIGS. 4A to 5B. The numerical values of the distances E1, E2, E3, E4 and the widths F1, F2, F3, F4, F5 are adjusted such that an opening angle of two rigid portions sandwiching a target bent portion is 90 degrees in each of the bent portions 302, 304, 306, 308, 402, 404 shown in FIGS. 4A to 5B. In this way, the second wiring material 220, the fourth wiring material 240 and the sixth wiring material 260 are wired in close contact with the front cross member 110, the rear cross member 120 and the rear floor 130, respectively. As a result, it is possible to contribute to space saving of wiring space where the wire harness is wired.

As shown in FIGS. 4A and 5A, the plurality of bent portions 302, 304, 306, and 308 are bent at 90 degrees and shapes thereof are restricted in such a state. The bent portions 302, 304, 306, 308 are provided at the positions facing the outer corner P1 and the inner corner Q1. As a result, the second wiring material 220 and the fourth wiring material 240 are externally fitted to the front cross member 110 and the rear cross member 120, respectively. As a result, the second wiring material 220 and the fourth wiring material 240 are aligned by the front cross member 110 and the rear cross member 120, and are fixed to the front cross member 110 and the rear cross member 120 in the horizontal direction. Such a structure in which the wiring material can be fixed to the body panel 1 without any fixing member is extremely useful.

As described above, according to the vehicle circuit body of the first embodiment according to the present invention, the second wiring material 220, the fourth wiring material 240 and the sixth wiring material 260 are wired in close contact with the front cross member 110, the rear cross member 120 and the rear floor 130, respectively. As a result, it is possible to contribute to the space saving of the wiring space where the wire harness is wired.

According to the vehicle circuit body of the first embodiment according to the present invention, the opening angle of the rigid portions 601, 603 centered on the bent portion 602 can be designed as desired by adjusting the numerical values of the distances E1, E2, E3, E4 and the widths F2, F3, F4, F5. In this way, a bent state of the wiring material can be designed without using any wire harness exterior component (protector, corrugated tube, tape and the like), which improves a degree of freedom in designing the wire harness.

According to the vehicle circuit body of the first embodiment according to the present invention, the bent portion 602 which is bent to fill the gaps between the conductor plates 621 to 625 may be regarded as one single metal plate having the thickness that is approximately equal to the total thickness of the conductor plates 621 to 625. Therefore, high current capacity can be provided as compared with a case where the bent portion is formed of a braid.

The numerical values of the distances E1, E2, E3, E4 and the widths F1, F2, F3, F4, F5 are adjusted such that the opening angle of the two rigid portions sandwiching the bent portion is 90 degrees in the vehicle circuit body of the first embodiment according to the present invention. The opening angle is not limited to 90 degrees. Any angle from 0 degree to 180 degrees can be employed. For example, if the opening angle is set to less than 90 degrees, the wiring material can be arranged in close contact with a certain inclined slope of the body panel 1. If the opening angle is set to 180 degrees, the wire harness can be folded when the wire harness is packed (the wire harness may be packed in a case when a supplier delivers the wire harness to a car manufacturer), and the packed wire harness can be downsized.

<Vehicle Circuit Body of Second Embodiment According to Present Invention>

Figure 7:
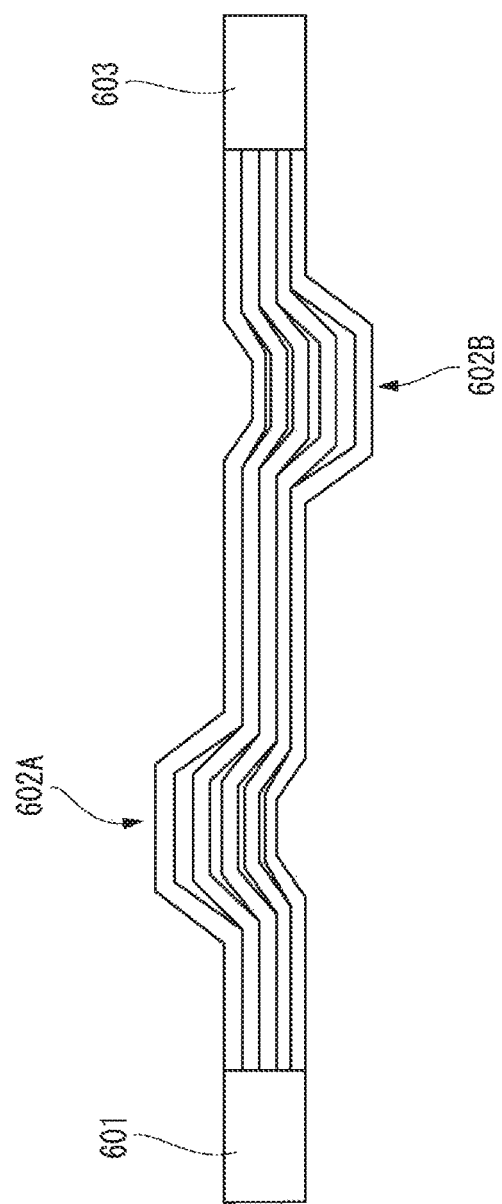
FIG. 7 is a side view of a bent portion and a rigid portion of a vehicle circuit body of a second embodiment according to the present invention.

Subsequently, a vehicle circuit body of a second embodiment according to the present invention will be described. The vehicle circuit body of the second embodiment differs from the vehicle circuit body of the first embodiment in the structure of the bent portion. Therefore, the structure of the bent portion will be described in detail herein, and changed descriptions of configurations common to those of the first embodiment will be omitted. FIG. 7 is a side view of bent portions and rigid portions of the vehicle circuit body of the second embodiment according to the present invention.

In the first embodiment, the wiring material in which the rigid portions 601, 603 and the bent portion 602 are formed can be bent in the direction opposite to the direction in which the portions on the two sides of the convex-shaped portion of the bent portion 602 protrude in the convex shape, while the bending in the same direction as the protruding direction of the convex shapes is restricted. In short, it means that such a wiring material can only be bent to one side of front and back sides. Meanwhile, there may be a case where it is desired to change the bending direction of the wire harness at the same location depending on situations. For example, in a case where the wire harness is wired in a vehicle, it is necessary to bend a certain location to one side, and it is necessary to bend the wire harness to the other side at the location in a case where the wire harness is packed.

Considering such a situation, a bent portion 602A and a bent portion 602B are provided in the wiring material in the vehicle circuit body of the second embodiment according to the present invention. Each one of the bent portions 602A, 602B has the same structure as that of the bent portion 602 described in the first embodiment. Meanwhile, a technical feature unique to the second embodiment is that the bent portion 602A and the bent portion 602B are continuously provided adjacent to each other, and convex shapes of conductor plates of the continuous bent portions 602A, 602B protrude in opposite directions, as shown in FIG. 7.

Due to such a point, the wiring material provided with the bent portions 602A, 602B can be bent to any one side of the front and back sides. Specifically, in a case where the rigid portions 601, 603 are displaced to approach each other downward in FIG. 7, the bent portion 602A is bent while the other bent portion 602B is not bent and a shape thereof is maintained. On the other hand, in a case where the rigid portions 601, 603 are displaced to approach each other upward in FIG. 7, the bent portion 602B is bent while the other bent portion 602A is not bent and a shape thereof is maintained.

The bent portions 602A, 602B whose structures are described above are applied to the bent portions 302, 304, 306, 308, 402, 404 described with reference to FIGS. 4A to 5B.

As described above, according to the vehicle circuit body of the second embodiment according to the present invention, the wiring material can be bent to any one side of the front and back sides. Therefore, for example, in cases where bending directions are different, such as the case where the wire harness is wired in the vehicle and the case where the wire harness is packed, the wiring material can be bent to a desired side.

<Vehicle Circuit Body of Third Embodiment According to Present Invention>

Figure 8:
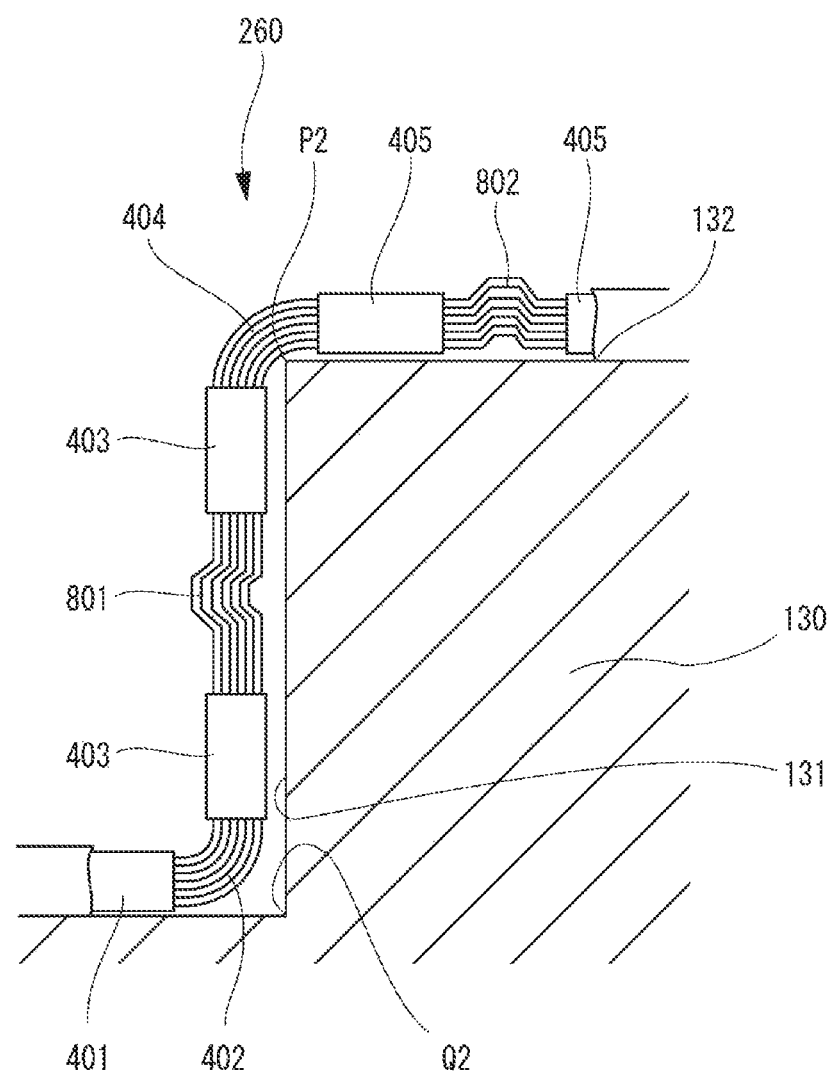
FIG. 8 is a side view of a vehicle circuit body of a third embodiment according to the present invention.

Subsequently, a vehicle circuit body of a third embodiment according to the present invention will be described. The vehicle circuit body of the third embodiment differs from the vehicle circuit body of the first embodiment or the second embodiment in a position where the bent portion is provided. Therefore, the position where the bent portion is provided will be described in detail herein, and changed descriptions of configurations common to those of the first embodiment or the second embodiment will be omitted. FIG. 8 is a side view of the vehicle circuit body of the third embodiment according to the present invention.

In the vehicle circuit body of the first embodiment or the second embodiment according to the present invention, the bent portions 302, 304, 306, 308, 402, 404 are provided at the positions facing the inner corner or the outer corner having concave or convex shapes formed on the body panel 1. The vehicle circuit body of the present invention has an excellent effect even when the position where the bent portion is provided is not the inner corner or the outer corner, that is, at a flat location of the body panel 1, FIG. 8 shows a state where the sixth wiring material 260 is deformed along a wall surface of the rear floor 130 and wired on the body panel 1. As shown in FIG. 8, a new bent portion 801 is located on a side surface 131 of the rear floor 130. Another new bent portion 802 is located on a top surface 132 of the rear floor 130. At this time, conductor plates of the bent portions 801, 802 protrude in directions opposite to directions facing the side surface 131 and the top surface 132, which are flat locations.

As described in the first embodiment or the second embodiment, one bent portion is bent only to one of the front and back sides and is restricted from being bent to the other side. Therefore, if the bent portion is arranged at the flat location as described above, the bent portion can be treated as a rigid member that does not bend. Therefore, the wiring material provided with the bent portions 801, 802 and the wiring material provided with the rigid portions instead of the bent portions can be treated in the same manner.

The vehicle circuit body of the third embodiment according to the present invention can obtain the following effects by intentionally providing the bent portions 801, 802 at the flat locations. That is, by adopting the structure in which the bent portions can be arranged not only at the inner corner or the outer corner having concave or convex shapes on the body panel 1 but also at the flat locations, the bent portions can be provided substantially anywhere in the vehicle circuit body. Since bent locations can be freely provided in the vehicle circuit body in this way, a degree of freedom in designing bent locations of the wire harness for packing is significantly improved.

According to the vehicle circuit body of the third embodiment according to the present invention, the bent portions 801, 802 wired at the flat locations can be expanded and contracted in a longitudinal direction. Therefore, dimensional tolerances of the rigid portions 301, 303, 305, 307, 309, 401, 403, 405 can be absorbed by the bent portions 801, 802. As a result, a degree of freedom in design of the vehicle circuit body is improved.

According to the vehicle circuit body of the third embodiment according to the present invention, the bent portions 801, 802 wired at the flat locations can damp vibrations propagating in the rigid portions 301, 303, 305, 307, 309, 401, 303, 405. Since a part of the vehicle circuit body is fixed to the body panel 1 by a clamp or bolts and nuts, vibrations generated in the body panel 1 propagate to the vehicle circuit body. Even when the vibrations propagate to the vehicle circuit body in this way, energy of the vibrations is converted into kinetic energy of the conductor plates of the bent portion, and thus vibrations passing through the bent portion are largely damped. In this way, the vibrations propagating in the rigid portions 301, 303, 305, 307, 309, 401, 403, 405 can be damped.

Here, features of the above embodiments of the vehicle circuit body according to the present invention will be briefly summarized in the following [1] to [6].

[1]

A vehicle circuit body (200) includes:

a bent portion (602) which is formed by bending a plurality of conductor plates (621 to 625) with a convex shape toward one side of a lamination direction in which the plurality of conductor plates are laminated, the plurality of conductor plates being laminated such that adjacent conductor plates are spaced apart from each other; and a rigid portion (601, 603) where the plurality of conductor plates extending from the bent portion are joined together to form a single layer.

The bent portion is provided at a position which faces an inner corner (Q1, Q2) or outer corner (P1, P2) of a concave or convex shape (front cross member 110, rear cross member 120, rear floor 130) formed on a body panel (1).

[2]

In the vehicle circuit body according to [1], in the bent portion, a distance (E1 to E4) between the adjacent conductor plates is increased while an interval width (F1 to F5) between two slopes of the conductor plates is increased toward the one side of the lamination direction, the slopes forming the convex shapes of conductor plates and facing each other.

[3]

In the vehicle circuit body according to [2], a first bent portion (304) and a second bent portion (306) are provided as the bent portion.

The rigid portion (305) is located between the first bent portion and the second bent portion.

Each conductor plate of the first bent portion and the second bent portion has a convex shape toward the one side of the lamination direction, and the first bent portion and the second bent portion are provided at positions which face the outer corner (P1) of the convex shape formed on the body panel.

[4]

In the vehicle circuit body according to [3], a third bent portion (302) and a fourth bent portion (308) are further provided as the bent portion.

The third bent portion and the fourth bent portion are respectively located at positions spaced apart from the first bent portion or the second bent portion with respect to the rigid portion.

Each conductor plate of the third bent portion and the fourth bent portion has a convex shape toward another side of the lamination direction, and the third bent portion and the fourth bent portion are provided at positions which face the inner corner (Q1) of the convex shape formed on the body panel.

[5]

The vehicle circuit body according to above [3] is characterized in that a fifth bent portion (602B) is further provided as the bent portion.

The fifth bent portion is provided continuously with at least one of the first bent portion to the fourth bent portion, and each conductive plate of the fifth bent portion has a convex shape protruding in a direction opposite to the bent portion (602A) which is continuous with the fifth bent portion.

[6]

The vehicle circuit body according to [1], wherein a sixth bent portion (801, 802) is further provided as the bent portion.

The sixth bent portion is provided at a position which faces a flat portion formed on the body panel.

According to the vehicle circuit body having the above configuration (1), the wiring material including the bent portion and the rigid portion can be wired in close contact with the concave and convex shapes of the body panel.

According to the vehicle circuit body having the above configuration (2), an opening angle of the rigid portions centered on the bent portion can be designed as desired by adjusting numerical values of the distance and the width.

According to the vehicle circuit body having the above configuration (3), the wiring material including the bent portion and the rigid portion is aligned by the concave and convex shapes of the body panel, and is fixed to the concave and convex shapes in a horizontal direction. Such a structure in which the wiring material can be fixed to the body panel without any fixing member is useful.

According to the vehicle circuit body having the above configuration (4), the wiring material including the bent portion and the rigid portion is aligned by the concave and convex shapes of the body panel, and is more firmly fixed to the concave and convex shapes in the horizontal direction. Such a structure in which the wiring material can be fixed to the body panel without any fixing member is useful.

According to the vehicle circuit body having the above configuration (5), the wiring material can be bent to any one side of front and back sides.

According to the vehicle circuit body having the above configuration (6), the bent portion located at the flat location portion can be treated as a rigid member that does not bend. Therefore, the wiring material provided with the bent portion at the flat location and the wiring material provided with the rigid portion at the flat portion can be treated in the same manner.

The vehicle circuit body of the present invention can be more closely in contact with the concave and convex shapes formed on the body panel, and has high versatility as a circuit body mounted on a vehicle.

What is claimed is:

1. A vehicle circuit body comprising:
a plurality of conductor plates laminated in a lamination direction such that each of the conductor plates is adjacent to at least another one of the conductor plates,
a bent portion which is formed by bending the plurality of conductor plates with a convex shape toward one side of the conductor plates in the lamination direction; and
a rigid portion where the plurality of conductor plates extending from the bent portion are joined together to form a single layer,
wherein the bent portion is configured to be arranged at a position which faces an inner corner or an outer corner of a shape formed on a body panel, the inner corner is a concave shape and the outer corner is a convex shape,
in the bent portion, each of the conductor plates are spaced away from an adjacent one of the conductor plates in the laminated direction by a respective one of a plurality of different distances, and the different distances increase relative to each other toward the one side in the laminated direction,
wherein in the bent portion, each of the conductor plates includes a pair of slopes that are spaced apart from each other by a respective one of a plurality of interval widths and face each other to form the convex shape, and the interval widths increase relative to each other toward the one side.

2. The vehicle circuit body according to claim 1, further comprising:
another bent portion configured to be arranged at a position which faces a flat portion formed on the body panel.

3. A vehicle circuit body comprising:
a plurality of conductor plates laminated in a lamination direction such that each of the conductor plates is adjacent to at least another one of the conductor plates,
a first bent portion and a second bent portion are formed by each of the conductor plates; and
a first rigid portion where the plurality of conductor plates extending from the first bent portion are joined together to form a single layer,
wherein the first rigid portion is located between the first bent portion and the second bent portion, and
each conductor plate of the first bent portion has a convex shape toward another side of the conductor plates in the lamination direction and each conductor plate of the second bent portion has a convex shape toward one side of the conductor plates in the lamination direction, and the first bent portion and the second bent portion are configured to be arranged at positions which face respective outer corners formed on the body panel, and each of the outer corners is a convex shape, and in at least one of the first bent portion and the second bent portion, each of the conductor plates are spaced away from an adjacent one of the conductor plates in the laminated direction by a respective one of a plurality of different distances, and the different distances increase relative to each other toward the one side in the laminated direction, wherein in the first bent portion, each of the conductor plates includes a pair of slopes that are spaced apart from each other by a respective one of a plurality of interval widths and face each other to form the convex shape, and the interval widths increase relative to each other toward the one side.

4. The vehicle circuit body according to claim 3, further comprising:
a second rigid portion and a third rigid portion; and
a third bent portion and a fourth bent portion respectively located at positions spaced apart from the first bent portion and the second bent portion by the second rigid portion and the third rigid portion, respectively,
wherein each conductor plate of the third bent portion has a convex shape toward the another side and each conductor plate of the fourth bent portion has a convex shape toward the another side, and the third bent portion and the fourth bent portion are configured to be arranged at positions which face respective inner corners formed on the body panel, and each of the inner corners is a concave shape.

5. The vehicle circuit body according to claim 4, futher comprising:
a fifth bent portion provided continuously with at least one of the first bent portion, the second bent portion, the third bent portion, and the fourth bent portion, and each conductor plate of the fifth bent portion has a convex shape protruding in a direction opposite to the at least one of the first bent portion, the second bent portion, the third bent portion, and the fourth bent portion which is continuous with the fifth bent portion.

* * * * *